US005181208A

United States Patent [19]

Duckeck

[11] Patent Number: 5,181,208

[45] Date of Patent: Jan. 19, 1993

[54] COMPUTATION-CONSERVING TRAFFIC DATA TRANSMISSION METHOD AND APPARATUS

[75] Inventor: Ralf Duckeck, Hildesheim, Fed. Rep. of Germany

[73] Assignee: Robert Bosch GmbH, Stuttgart, Fed. Rep. of Germany

[21] Appl. No.: 447,578

[22] Filed: Dec. 7, 1989

[51] Int. Cl.[5] .............................................. G06F 11/10

[52] U.S. Cl. .................................. 371/40.1; 455/228; 455/345

[58] Field of Search ....................... 371/40.1, 40.2, 30, 371/69.1; 455/228, 345; 340/905; 364/436, 443, 444, 449

[56] References Cited

U.S. PATENT DOCUMENTS

| | | | |
|---|---|---|---|
| 3,949,401 | 4/1976 | Hegeler | 343/200 |
| 4,380,821 | 4/1983 | Eckhardt et al. | 455/33 |
| 4,435,843 | 3/1984 | Eilers et al. | 455/205 |
| 4,450,589 | 5/1984 | Eilers et al. | 455/205 |
| 4,456,790 | 6/1984 | Soyack | 379/102 |
| 4,499,603 | 2/1985 | Eilers | 455/205 |
| 4,538,285 | 8/1985 | Gielis | 371/69.1 X |
| 4,662,513 | 8/1989 | Brägas | 455/45 |
| 4,888,699 | 12/1989 | Knoll et al. | 364/449 |
| 4,903,269 | 2/1990 | Fedele | 371/57.2 |
| 4,907,159 | 3/1990 | Mauge et al. | 364/436 |
| 4,908,828 | 3/1990 | Tikalsky | 371/69.1 |
| 4,963,909 | 10/1990 | Fukui | 354/786 |
| 4,995,041 | 2/1991 | Hetherington | 371/40.1 |
| 5,020,143 | 3/1991 | Duckeck | 455/186 |

FOREIGN PATENT DOCUMENTS

| | | | |
|---|---|---|---|
| 35025 | 2/1986 | Japan | 455/228 |
| 44630 | 2/1989 | Japan | 455/226 |
| 44632 | 2/1989 | Japan | 455/230 |
| 44635 | 2/1989 | Japan | 455/226 |
| 195727 | 8/1989 | Japan | 455/345 |
| 2050767 | 1/1981 | United Kingdom . | |
| 2208984 | 4/1989 | United Kingdom | 455/228 |

OTHER PUBLICATIONS

Boretz, "TravelPilot System Set for End-of-Year Debut," Automotive Electronics Journal. Jan. 29, 1990, p. 19.

RDS Specification, pp. 11-13, 22-23, 30-31 Mar. 1984.

*Primary Examiner*—Robert W. Beausoliel
*Attorney, Agent, or Firm*—Frishauf, Holtz, Goodman and Woodward

[57] ABSTRACT

In the evaluation of traffic announcements received in digitally encoded form in a data packet, the data packet is decoded continuously, and the traffic announcements are stored in memory after the decoding and evaluation. A computer in the receiver must evaluate the incoming data stream continuously. Since evaluation is difficult, particularly under unfavorable broadcasting conditions in which error corrections may be necessary, the computer would have to have a very complex program structure and configuration. To make it possible to use a simpler computer configuration and program structure, one complete cycle of traffic announcements is first decoded, optionally error corrected and stored in memory. Next, an updating bit present in the data packet and altered upon any change in the traffic announcements, is identified and evaluated. As a fuction of this evaluation, a further complete cycle of traffic announcements is decoded and stored in memory only if the updating bit has altered.

10 Claims, 3 Drawing Sheets

COMPUTATION-CONSERVING TRAFFIC DATA TRANSMISSION METHOD AND APPARATUS

Cross-reference to related U.S. patent and applications, the disclosures of which are hereby incorporated by reference: U.S. Pat. No. 3,949,401, HEGELER; U.S. Pat. No. 4,435,843 and U.S. Pat. No. 4,450,589, EILERS & BRAGAS; U.S. Pat. No. 4,499,603, EILERS; Ser. No. 07/ , DUCKECK, filed Dec. 7, 1989 (claiming priority of German P 38 20 639.0 of Jun. 18, 1988); Ser. No 07/447,165, BRAGAS & DUCKECK, filed Dec. 7, 1989 (based on German P 38 20 640.4 of Jun. 18, 1988).

FIELD OF THE INVENTION

The invention relates to a method for evaluating traffic announcements received in digitally encoded form in a data packet.

With the introduction of the Radio Data System (RDS) of the European Broadcasting Union (EBU), it becomes possible to transmit not only the modulation of an FM radio program but also data. In addition to information on the stations received, the program content and traffic announcements can also be broadcast. Compared with traffic announcements that are sent in the clear in the form of tone modulation either after an interruption of the ongoing program or at predetermined times, the transmission of digital signals presents the opportunity of broadcasting traffic announcements without interrupting the program. The possibility exists of transmitted encoded brief information items that can then be called up in the receiver in the form of the standardized texts that are also largely used to word the traffic announcements broadcast in the clear.

How this is done in practice is that in the traffic studio, the incoming reports are input into a personal computer that forms encoded information from it, assembles the information in blocks, and passes it to an encoder; the encoder then feeds the traffic announcements cyclically into the data packet. Once such a cycle of traffic announcements has been run through, the same cycle is repeated until altered traffic announcements are broadcast by re-input or changes in the personal computer. This cycle is again repeated until such time as a new change occurs.

Since a cycle of traffic announcements is repeated every few seconds or minutes, it can be expected, depending on the length of the announcements, that they will be repeated several times cyclically before any changes are made. The events for decoding and evaluating the traffic announcements would then be repeated multiple times in the same way in the vehicle radio, yet without providing the driver of the car with any additional information as a result of this repeated evaluation. Instead, computation capacity would simply be uselessly tied up. Under difficult broadcasting conditions, it may additionally become necessary to correct possible errors in the data packet, which requires additional computation capacity and computation time.

The object of the invention is to improve a method and apparatus for evaluating traffic announcements received in digitally encoded form in a data packet, so as to make better use of the computation capacity and as a result making for less effort in programming the computer and a simpler computer configuration.

The invention makes use of the finding that once traffic announcements have been correctly evaluated, reevaluation is unnecessary as long as no changes have occurred. To this end, in addition to the part of the data packet that contains the content of the traffic announcements, an updating bit is transmitted, which maintains its state as long as no changes have taken place. Only when changes occur does it change its state, so that it forms a criterion for whether reevaluation of the data packet should be done or not.

Since the updating bit includes only one bit, its correct evaluation can be done much faster and more simply than the evaluation of the entire data packet or of the entire part of the data packet pertaining to the content of traffic reports. Based on the concept that traffic announcements do not change until after multiple cycles have been run, a substantial simplification is attained overall, despite the intrinsically necessary increase in computation capacity for the additional evaluation of the updating bit.

For the driver, there is also the advantage that if reception is initially good, so that satisfactory evaluation of the traffic announcements is possible, but later worsens, making usable evaluation of traffic announcements impossible even if provisions for error correction are employed, then the traffic announcements stored in memory are maintained. There is also the advantage that a time-consuming error correction extending over a plurality of cycles of the broadcast traffic announcements can be performed, so that a smaller computation capacity can suffice. Finally, at times when the evaluation of the updating bit does not indicate any change in the traffic announcements, the computer can be used for other purposes.

The invention also relates to a radio receiver for carrying out the aforementioned method.

In this connection, the object is to improve a radio receiver such that the computation capacity of the onboard computer is better exploited, and that simpler programming and configuration are possible.

Further features of the invention will become apparent from the claims, description and drawing, which shows an exemplary embodiment.

DRAWINGS

Shown in the drawing are:

FIG. 1, a block circuit diagram of a radio receiver in accordance with the invention;

FIG. 2, a graphic illustration of a detail of the RDS packet; and

FIG. 3, a flow chart of a program course as stored in memory, in the form of a control program in the program memory of the computer.

DETAILED DESCRIPTION

Figure 1:
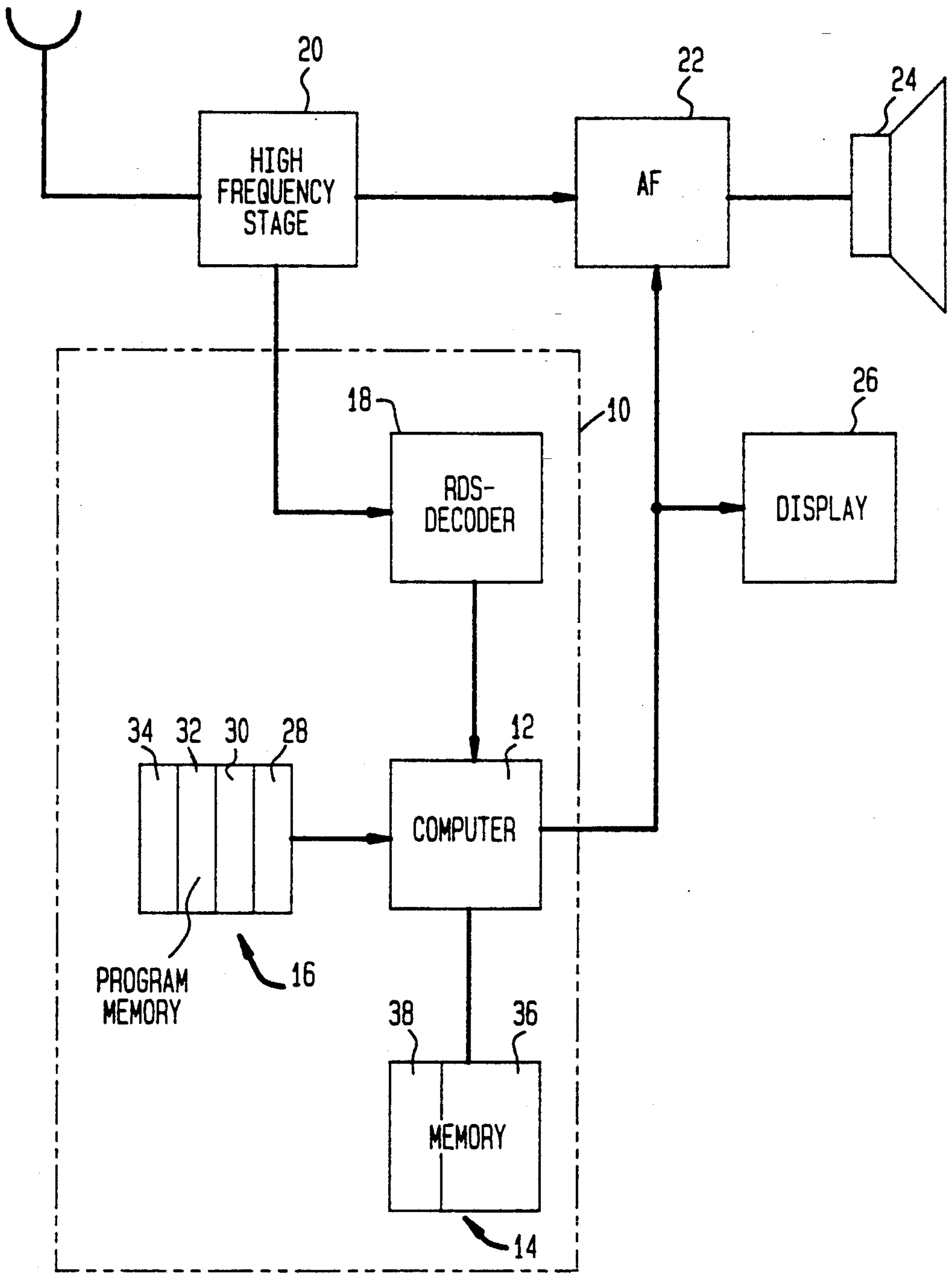

The block circuit diagram of a radio receiver shown in FIG. 1 includes a high frequency (HF) part 20, a audio frequency (RF) part 22, a loudspeaker 24, a decoder 10 and a display device 26. Signals coming in via the antenna are demodulated in the high frequency part 20, while the tone modulation is delivered to the audio frequency part 22 and reproduced via the loudspeaker 24. The demodulated auxiliary carrier is delivered to an RDS decoder 18 present in the decoder 10; the decoder 18 decodes the data packet. Within the data packet, a part including traffic announcements is designated as a TMC (traffic message channel). This channel is evaluated by the computer 12, which is controlled by a control program stored in memory locations 28 of the program memory 16. The traffic announcements evaluated reach memory locations 14 of a memory 36. The computer 12 is capable of forming standardized traffic announcements from the decoded data, words, and these announcements are delivered to the audio frequency part 22 and to the display device 26 and are reproduced via the loudspeaker 24 in the form of synthetic speech and/or alphanumerically via the display device 26.

Other memory locations 30, 32 and 34 in which further control programs are stored are also located in the program memory 16. These programs can control the computer 12 alternatively or in addition. The memory 36 additionally includes a memory location 38, in which an updating bit present in the data packet is stored in accordance with its evaluation.

Figure 2:
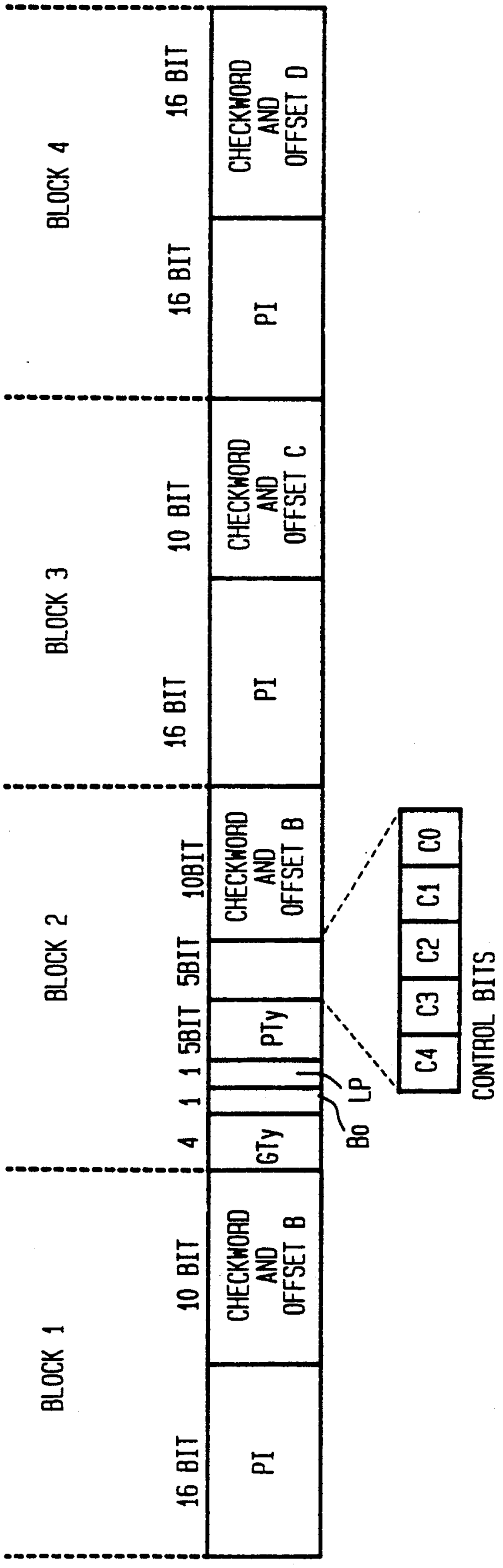

For explanation of the data packet decoded by the RDS decoder 18, see FIG. 2, which schematically shows four blocks each for one RDS group. Each block includes 26 bits, the first 16 bits of which contain data and the last 10 bits of which contain a checkword for error recognition and an offset as a synchronizing word. Of the first 16 bits for data words present in block 2, the first four bits are reserved as a group code GTy; the next bit B0 is reserved as an offset code; the next bit is reserved as an ARI identification bit TP; and the next five bits are reserved as a program type PTy. Up to the last 10 bits of this block 2, there are accordingly still five control bits C4, C3, C2, C1 and C0 left over. One of these control bits can be used as an updating bit; preferably, this is bit C1.

In block 4, the 16 bits of data words are reserved for traffic announcements. For broadcasting traffic announcements, a plurality of RDS groups are broadcast until one cycle of traffic announcements has been completed. As long as no changes have been made in ensuing cycles, the control bit C1, as an updating bit, is kept in its existing state. When a change occurs, the encoder in the transmitter makes this bit change its state, until a further change alters the state of the updating bit again, in such a way that the original state is resumed. By evaluating the updating bit either continuously or at short time intervals, it thus becomes possible to obtain a criterion for whether the traffic announcements have been altered, or not.

Figure 3:
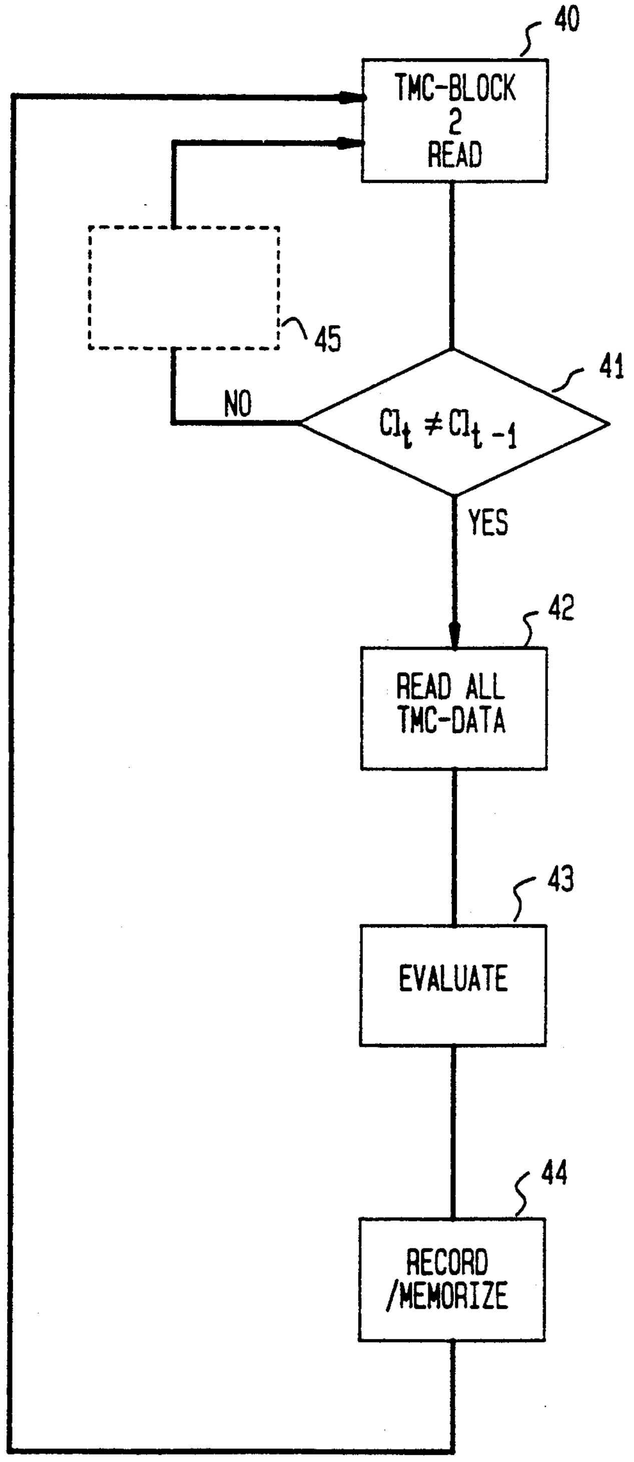

FIG. 3 is a flow chart of the control program stored in the memory location 28 of the program memory 16. This program begins at 40, with a method step called "read TMC-block 2". In this method step, the updating bit C1 in block 2 is identified. In the next method step, 41, the updating bit $C1_t$ that has been read is compared with the previously memorized updating bit $C1_{t-1}$.

If the comparison shows inequality, then all the TMC data are read in method step 42. The data read are then evaluated in a method step 43 and stored in memory in a method step 44.

After the storage in memory, a return to method step 40 takes place, in which the (Traffic Message Channel) TMC-block 2 is once again read. If no change in the traffic announcements has occurred in the meantime, then the comparison performed in method step 41 between the current updating bit $C1_t$ and the previously memorized updating bit finds equality, or in other words produces a "NO" decision in the check for inequality.

In that case, a return is again made to the method step 40; or, other programs can be performed in the meantime, as represented by method step 45 shown in dashed lines. Once these programs have ended, a return is again made to method step 40, and the course of the program as described is repeated.

By means of the method step 45, it is for instance possible to call up a second control program, stored in memory locations 30, by means of which a return to method step 40 to identify the updating bit is performed only at set, predetermined times or at set, predetermined time intervals.

Under particularly poor reception conditions, in which the data packet has errors, a third control program stored in the memory locations 32 of the program memory 16 can also be called up, by means of which an error correction of the TMC data that have been read and thus of the traffic announcements is performed. This correction program may be so time-consuming that it takes up several traffic announcement broadcast cycles. If no change in the updating bit takes place during the cycles, then the error correction can be continued until a corrected traffic announcement is available, or until the hopelessness of a possibility for correction has been established and the correction process is discontinued. An ongoing correction is discontinued no later than whenever the updating bit has altered, and the newly arriving TMC data are then read out.

Finally, the possibility also exists of storing a fourth control program in memory locations 34 of the program memory 16, by means of which program the computer can be switched over for performing further programs. These programs may be associated with the acoustical or visual reproduction of the traffic announcements, or may for instance control other functions of the radio receiver.

These provisions enable either more economical use of the computer used, or the use of a simpler computer structure for more extensive computations, so that complex computations that require longer computation time, for instance extending over several cycles of traffic announcement broadcasting, can still be performed.

I claim:

1. A method for evaluating traffic announcements received in digitally encoded form in a data packet formatted according to Technical Standard 3244-E of the European Broadcasting Union and thus containing a plurality of data blocks, each block consisting of an information word followed by an error correction checkword, in which method the data packet is decoded and the traffic announcements are stored in memory after decoding and evaluation, comprising, in accordance with the invention, the steps of decoding at least one data packet and extracting therefrom information as to how many traffic announcements will be broadcast in one complete cycle of announcements, before broadcasting of a repetition or second cycle of said announcements begins;

using said checkwords in detecting and correcting any errors in information words representing traffic announcements;

storing the thus-corrected traffic announcements in memory until a first complete cycle of announcements has been stored;

identifying, in said data packet, at least one bit indicating whether any announcement in said cycle has been updated; and decoding and storing, in memory, a further complete cycle of announcements if and only if an update is indicated, thereby conserving computation capacity when an update is not indicated.

2. The method of claim 1, further comprising performing said identifying step only at set, predetermined times or at set, predetermined time intervals.

3. The method of claim 1, further comprising discontinuing said error correcting step upon the occurrence of either of the following events:

receipt of an update bit indicating that the traffic announcement cycle, whose correction is being attempted, is being superceded by an updated announcement cycle; and unsuccessful conclusion of a predetermined number of correction operations.

4. The method of claim 1, wherein said identifying step comprises (FIG. 2)

evaluating a bit in a predetermined sequential position within said data packet, namely a predetermined one of 5 bits ($C_4$–$C_0$) designated in said Technical Standard as control bits and located in a second one of said blocks within said packet.

5. The method of claim 4, wherein said predetermined control bit is bit $C_1$, the fifteenth bit of the information word in block 2, as defined by the Radio Data System specification.

6. A radio receiver, in particular a vehicle radio receiver, having a decoder (10) for decoding traffic announcements received in digitally encoded form, in particular those broadcast by the RDS system, having a computer (12) for evaluating a data packet and a memory (14) for memorizing the traffic announcements, characterized in that the computer (12) includes a program memory (16) having a control program by means of which the computer is controlled in such a way by the control program that first one complete cycle of traffic announcements is decoded, optionally error corrected and inscribed into the memory (14); that next, an updating bit present in the data packet and altered upon any change in the traffic announcements is identified and evaluated; and that only if the updating bit has been altered is a further complete cycle of traffic announcements decoded and the memory contents rewritten with these altered traffic announcements.

7. The radio receiver of claim 6, characterized in that a second control program is present in the program memory (16), by means of which the updating bit present in the data packet is identified only at set, predetermined times or at set, predetermined time intervals.

8. The radio receiver of claim 6, characterized in that a third control program is present in the program memory (16), by means of which program, for traffic announcements containing errors, an error correction is performed that is discontinued only when the possibility of correction is hopeless, but no later than upon evaluation of an altered updating bit.

9. The radio receiver of claim 6, characterized in that a fourth control program is present in the program memory (16), by means of which program the computer (12) is switched over for performing further programs.

10. A radio receiver, having a decoder (10) for decoding traffic announcements received, in a repeated cycle of such announcements, in digitally encoded form, a computer (12) for evaluating a data packet received from said decoder and a memory (14) for memorizing the traffic announcements, characterized in that the computer (12) includes a program memory (16) having a control program by means of which the computer is controlled in such a way by the control program that first, one complete cycle of traffic announcements is decoded, error-corrected and inscribed into the memory (14); that next, an updating bit, present in the data packet and altered upon any change in the traffic announcements, is identified and evaluated; and that only if the updating bit has been altered is a further complete cycle of traffic announcements decoded and the memory contents rewritten with these altered traffic announcements.

* * * * *